(12) United States Patent
Marshall

(10) Patent No.: US 6,747,711 B2
(45) Date of Patent: Jun. 8, 2004

(54) APPARATUS FOR PROVIDING A SIMULATED NIGHT VISION DISPLAY

(75) Inventor: Paul Marshall, Newark (GB)

(73) Assignee: Seos Limited (GB)

( * ) Notice: Subject to any disclaimer, the term of this patent is extended or adjusted under 35 U.S.C. 154(b) by 0 days.

(21) Appl. No.: 10/097,779

(22) Filed: Mar. 14, 2002

(65) Prior Publication Data

US 2002/0130982 A1 Sep. 19, 2002

(30) Foreign Application Priority Data

Mar. 14, 2001 (GB) ............................................ 0106275

(51) Int. Cl.[7] ............................................ G02F 1/1335
(52) U.S. Cl. ............................................ 349/15; 349/13
(58) Field of Search ............................ 349/13, 15, 68; 362/471, 106; 353/85

(56) References Cited

U.S. PATENT DOCUMENTS 5,380,204 A    1/1995   Decker
5,413,483 A  * 5/1995   Witt, III ........................ 434/11
6,196,845 B1 * 3/2001   Streid ............................ 434/44

FOREIGN PATENT DOCUMENTS

WO        WO 01/33866 A1    10/2001

* cited by examiner

Primary Examiner—James Dudek
Assistant Examiner—Richard H Kim
(74) Attorney, Agent, or Firm—Iandiorio & Teska

(57) ABSTRACT

Apparatus (2) for providing a simulated night vision goggle display, which apparatus comprises night vision goggle means (4), reflective micro-display means (6) for illuminating the night vision goggle means (4), tracker means (8) for tracking the attitude of the night vision goggle means (4), and image generator means (10) for providing infrared images to the night vision goggle means (4), the image generator means being such that it has a first channel which is used to drive the reflective micro-display means (6) with a high level of illumination, a second channel which is used to drive the reflective micro-display means (6) with a medium level of illumination, and a third channel which is used to drive the reflective micro-display means (6) with a low level of illumination.

8 Claims, 3 Drawing Sheets

APPARATUS FOR PROVIDING A SIMULATED NIGHT VISION DISPLAY

FIELD OF THE INVENTION

This invention relates to apparatus for providing a simulated night vision display and, more especially, this invention relates to apparatus for providing a simulated night vision display utilising night vision goggle means.

BACKGROUND OF THE INVENTION

There are two currently known basic approaches for providing night vision goggle training in simulators such for example as flight simulators. The first basic approach uses simulation, and the second basic approach uses stimulation.

With the simulation approach, an instrument based on the actual issued night vision goggle means is used in conjunction with tracker means and a dedicated image generator. The tracker means is usually a 3 degrees of freedom tracker means. The tracker means determines the wearer's attitude in space, which in turn is passed to an auxiliary image generator for providing simulated infrared night vision goggle images. These images are then passed to a miniature cathode ray tube display (visible green phosphor) housed in a dummy night vision goggle casing. The image generator data base must attempt to faithfully replicate the night vision goggle shortcomings such for example as blooming, noise, smear, and AGC effects. The image generator data base must also attempt to faithfully replicate the changed appearance of objects illuminated largely by infrared.

With the stimulation technique, actual out of the window imagery presented by the simulator visual is used to stimulate real night vision goggles. In order to do this, the simulator visual must be run at very low light levels, and a high degree of light tightening against stray illumination must be offered. Whilst this technique can be effective, using as it does actual night vision goggles, the data base must still be altered to give the correct appearance of objects seen largly with infrared. The imagery, although being presented by actual night vision goggles, does not fully represent actual conditions due to the fact that the night vision goggles are being illuminated by visible light only. The stimulation technique can only be used with simulator displays that can operate right down to cut off. This usually precludes any other form of display except cathode ray tube based displays. The degree of light tightening can be difficult to achieve and maintain. In addition, if the wearer looks around the night vision goggle oculars, a rather unconvincing night time image is seen, which is usually only red in colour.

In connection with the above mentioned basic simulation technique, it is also known to use miniature cathode ray tube displays to excite actual night vision goggles. However, this was done with visible light and the variation was rejected due to the size and weight of the cathode ray tube and its systems. With the above mentioned basic stimulation technique, some high end systems have used a fourth infrared cathode ray tube over and above the usual red, green and blue ones in order to stimulate the night vision goggles at infrared, and yet maintain a valid visible light image for direct view purposes. This has the disadvantage of requiring an extra image generator channel as well as extra cathode ray tubes.

None of the above mentioned approaches to effective night vision training are able to simulate the constant re-focusing required when night vision goggles are used near to the ground, or in air to air re-fuelling, when the very limited depth of field of night vision goggles becomes a major problem. In addition, none of the above mentioned basic approaches to night vision goggle training can readily address the dynamic range of the illumination presented to night vision goggles. This ranges from signals lost in inherent tube noise (less than starlight illumination) to almost daylight levels. It is under these conditions that many night vision goggle defects are exacerbated. The root cause of the lack of dynamic range stems from the typically eight bit (256 level) nature of the video signals from the image generator. Various schemes have been attempted to increase this lack of dynamic range, by using motorized neutral density filters or by re-using the redundant bloom channel, switched over in attenuated form to add to the red channel being used to stimulate the night vision goggles. These schemes have not been particularly successful.

SUMMARY OF THE INVENTION

It is an aim of the present invention to reduce the above mentioned problems.

Accordingly, the present invention provides apparatus for providing a simulated night vision goggle display, which apparatus comprises night vision goggle means giving night vision at night, reflective micro-display means for illuminating the night vision goggle means, tracker means for tracking the attitude of the night vision goggle means, and image generator means for providing infrared images to the night vision goggle means, the image generator means being such that it has a first channel which is used to drive the reflective micro-display means with a high level of illumination, a second channel which is used to drive the reflective micro-display means with a medium level of illumination, and a third channel which is used to drive the reflective micro-display means with a low level of illumination.

The apparatus may be one in which the reflective micro-display means is a ferroelectric liquid crystal display reflective micro-display means. The ferroelectric liquid crystal reflective micro-display means is preferably in the form of a panel. Reflective micro-display means other than the ferroelectric liquid crystal display reflective micro-display means may be employed if desired.

Usually, the tracker means will be a 3 degrees of freedom tracker. Such a tracker will normally be satisfactory for flight simulators. If desired, for example for other types of simulators, a full 6 degrees of freedom tracker may be used. Such a full 6 degrees of freedom tracker tracks both position and angle.

The apparatus may be one in which the first, second and third channels are each assigned to at least one light emitting diode, and in which the light emitting diodes for each of the first, second and third channels have progressively lower light outputs. The progressively lower light outputs may be achieved electrically, or with the use of neutral density filters.

The apparatus may be one in which the night vision goggle means has potentiometer focusing means for focusing the night vision goggle means. The potentiometer focusing means may be arranged to operate a mechanical focus wheel found in known night vision goggle means.

The night vision goggle means will usually be binocular. If desired however, the night vision goggle means may be monocular.

BRIEF DESCRIPTION OF THE DRAWINGS

Embodiments of the invention will now be described solely by way of example and with reference to the accompanying drawings in which.

DETAILED DESCRIPTION OF THE DRAWINGS

Figure 1:
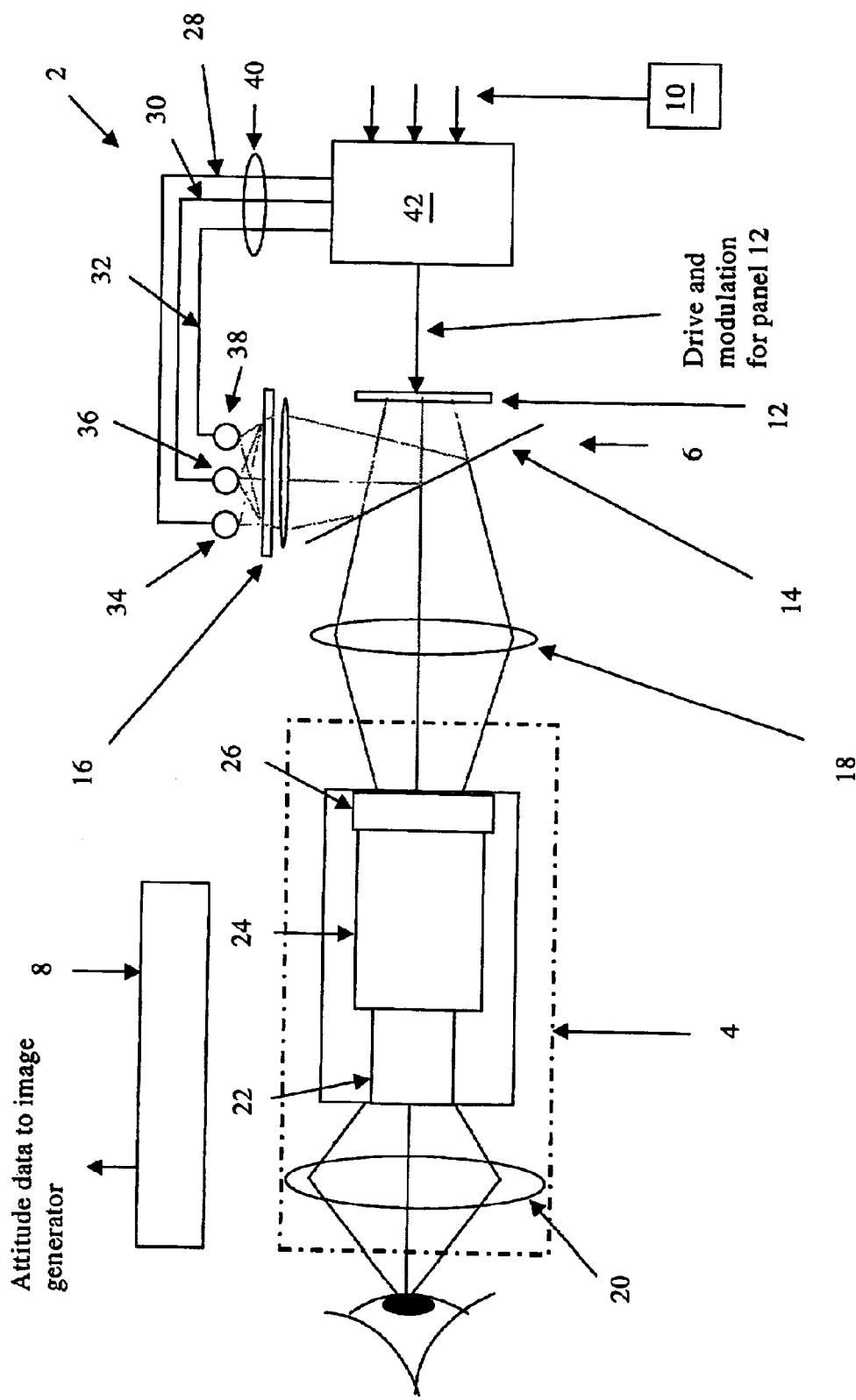
FIG. 1 shows apparatus for providing a simulated night vision goggle display.

Referring to FIG. 1, there is shown apparatus 2 for providing a simulated night vision goggle display. The apparatus 2 comprises night vision goggle means 4, reflective micro-display means 6 for illuminating the night vision goggle means 4, and tracker means 8 for tracking the attitude of the night vision goggle means 4. The apparatus 2 also comprises image generator means 10 for providing simulated infrared video images to the night vision goggle means 4 via reflective micro-display means 6. The image generator means 10 is such that it has a first channel which is used to drive the reflective micro-display means 6 with a high level of illumination, a second channel which is used to drive the reflective micro-display means 6 with a medium level of illumination, and a third channel which is used to drive the reflective micro-display means 6 with a low level of illumination.

As shown in FIG. 1, the reflective micro-display means 6 comprises a ferroelectric liquid crystal display reflective micro-display means in the form of a panel 12. Also employed are a beamsplitter 14, an optical diffuser and lens 16, and front end imaging optics 18.

The tracker means 8 is a 3 degrees of freedom tracker. It tracks the attitude of the night vision goggle means 4. Data on the attitude of the night vision goggle means 4 is passed to the image generator 10.

The night vision goggle means 4 comprises optics 20, a phosphor screen and fibre optic device 22, a micro-channel plate multiplyer 24, and a faceplate and photocathode 26.

In FIG. 1, the first, second and third channels of the image generator means 10 are shown as first channel 28, second channel 30, and third channel 32. The first channel 28 is assigned to a light emitting diode 34. The second channel 30 is assigned to a light emitting diode 26. The third channel 32 is assigned to a light emitting diode 38. The light emitting diode 34 has a high level of illumination. The light emitting diode 36 has a medium level of illumination. The light emitting diode 38 has a low level of illumination. As shown in FIG. 1, the first, second and third channels 28, 30, 32 are driven from light emitting diode drive means 40 which is in turn driven from interface electronics 42.

As can be seen from FIG. 1, the apparatus 2 utilizes the panel 12 mounted in the actual body of the night vision goggle means 4 to illuminate the night vision goggle tube directly. The illumination is performed at infrared in order to facilitate the best replication of night vision goggle defects.

During operation, the tracker means 8 senses the attitude of the night vision goggle means 4. An auxiliary image generator channel provides infrared viewed imagery to the night vision goggle means 4.

By using all three of the red, green and blue channels of the image generator means 10, increased dynamic range can be achieved by driving the panel 12 with all of them. Each channel 28, 30, 32 is assigned to a light emitting diode 34, 36, 38 respectively having progressively lower peak light outputs. This may be achieved electrically or by the use of neutral density filters. Each light emitting diode 34, 36, 38 may alternatively be groups of light emitting diodes. A large dynamic range from relatively bright to very dark can be achieved with no moving mechanism.

Due to the pulse width modulated method of modulation coupled with the field sequential display of "colours" in the panel 12, simultaneous use of extreme dark and bright is not possible. However, judicious use of data base effects coupled to actual effects generated by the night vision goggle means 4 itself results in a much more realistic impression of night vision goggle operations.

Figure 2:
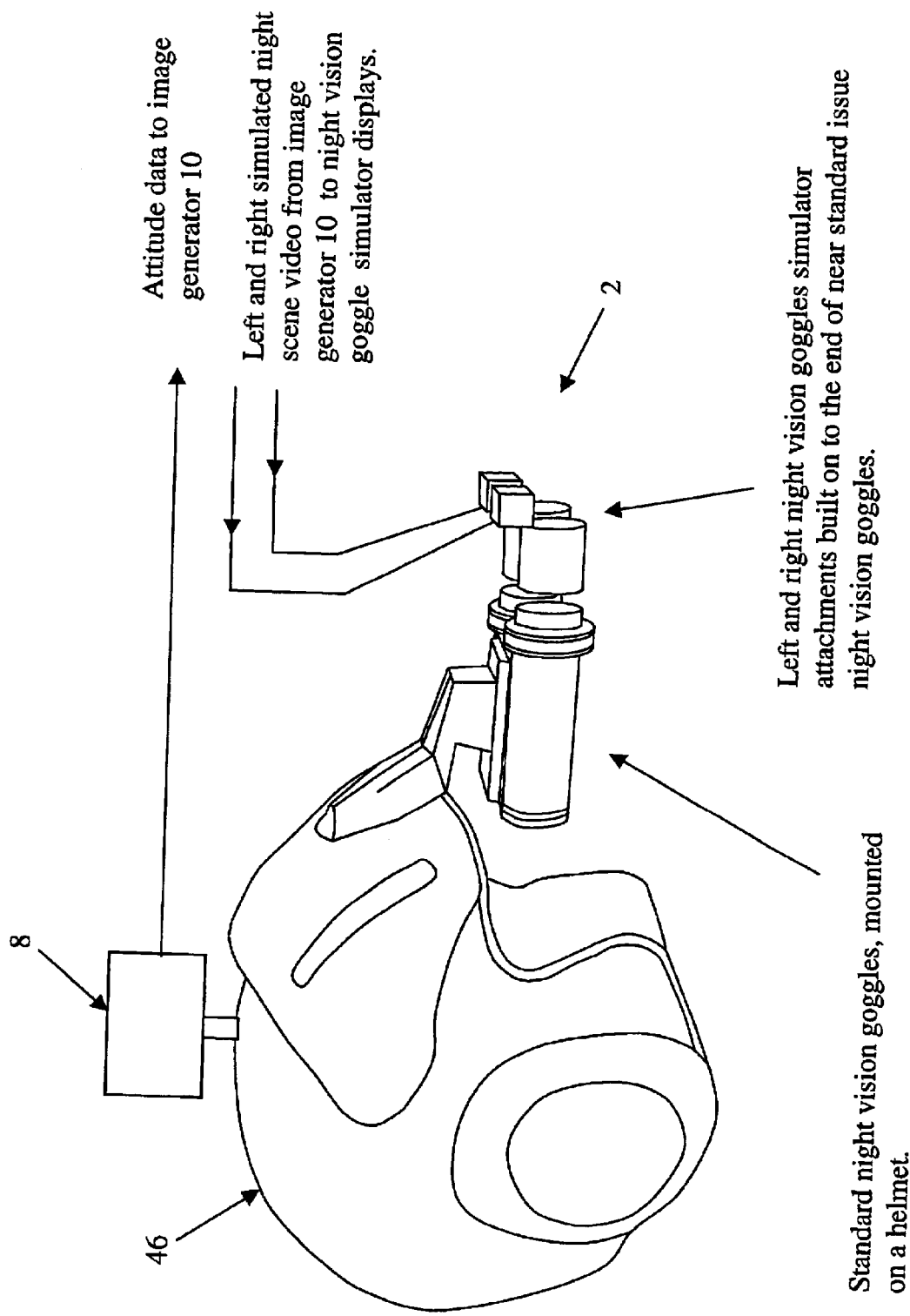
FIG. 2 shows the apparatus of FIG. 1 mounted on a helmet.

Because the panel 12 is very small and light, it can easily be integrated into the actual night vision goggle means 4 without losing the natural balance or feel of the real thing. Indeed, apart from the input optics, the remainder of the night vision goggle means 4 can be standard as can be best appreciated from FIG. 2 which shows the apparatus 2 mounted on a helmet 46.

Figure 3:
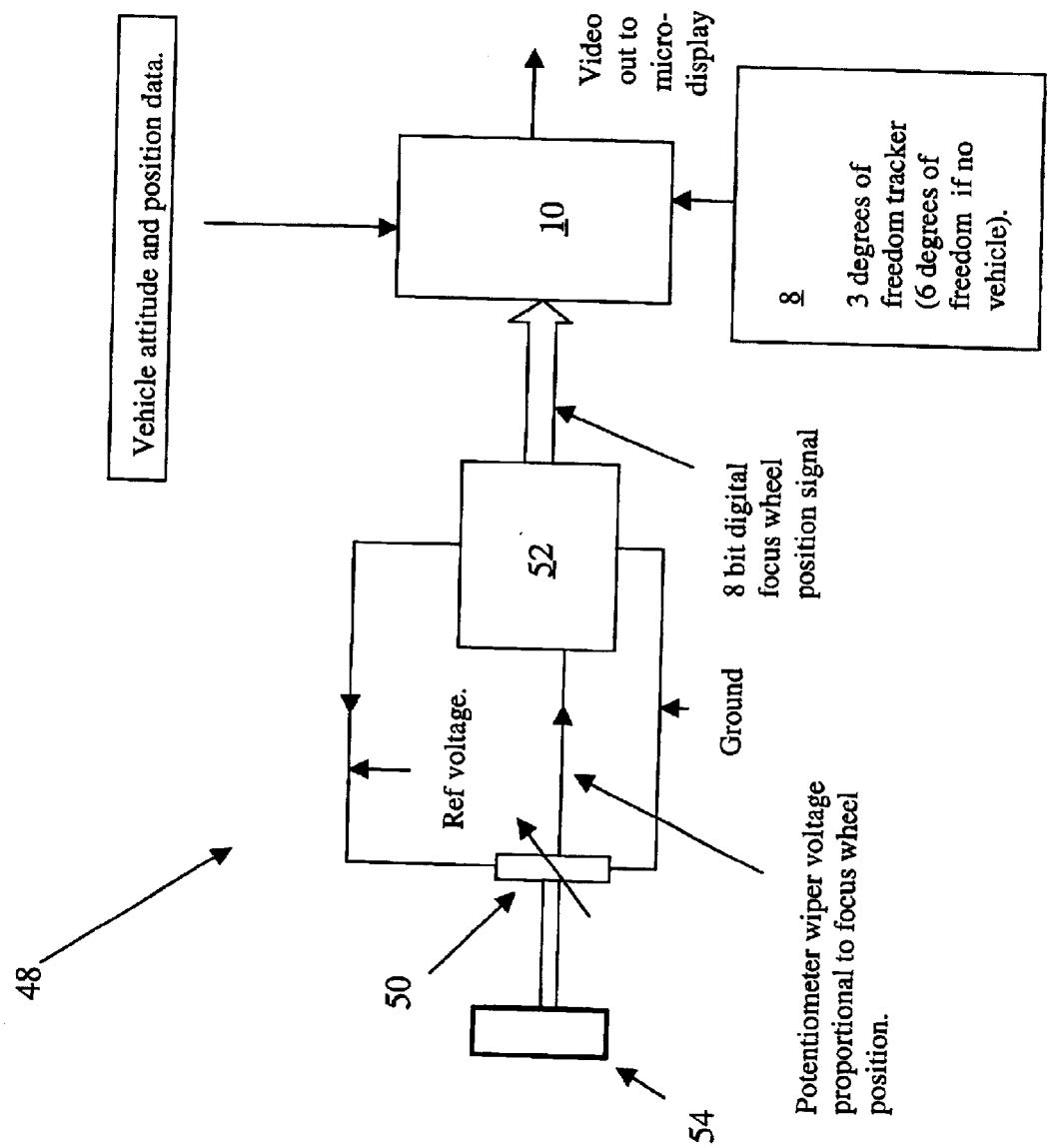
FIG. 3 shows potentiometer focusing means suitable for focusing the night vision goggle means employed in FIGS. 1 and 2.

Referring now to FIG. 3, there is shown potentiometer focusing means 48 for focusing the night vision goggle means 4. The potentiometer focusing means 48 comprises a potentiometer 50 and an analog to digital converter 52 connected to each other as shown and also connected to the image generator means 10 via an 8 bit digital focus wheel position signal. The tracker means 8 is also connected as shown to the image generator means 10. The potentiometer 50 is coupled to a mechanical focus wheel 54 normally employed for effecting mechanical focal adjustment on the night vision goggle means 4.

The potentiometer focusing means 48 shown in FIG. 3 helps to solve the problem which is often found with night vision goggles and which is that of replicating depth of field. In practical use, a user of known night vision goggles is often required to keep adjusting the manually operated focus wheel of the night vision goggles as objects within the field of view change range and hence change their focus requirements. With the potentiometer focus means 48 shown in FIG. 3, the normal mechanical focus function is disabled, and it is instead coupled to the potentiometer 50 as shown.

The computer in the image generator means 10 knows the relative range of the user of night vision goggle means 4 from objects in scenes, for example a tank, a building or an aircraft. The "inner focus" range determined by the potentiometer focusing means 48 can then be used by the computer to "de-focus" the generated images, save for those that fall in the "in focus" range. The "de-focus" function is then carried out by limiting the generated image resolution in software. The resolution of the image becomes progressively more as the focus wheel "range" approaches the "actual" range.

In some instances, if the user is not in a vehicle such for example as an aircraft or tank, then the computer of the image generator means 10 will not know the range of the user from the object or objects in a scene. In these cases, for example a person on foot, it would be necessary to have this information, and this would be done by replacing the 3 degrees of freedom tracker means 8 with a 6 degrees of freedom tracker means 8 which delivers position as well as attitude.

It is to be appreciated that the embodiments of the invention described above with reference to the accompanying drawings have been given by way of example only and that modifications may be effected. Thus, for example, the night vision goggle means 4 will usually be a pair of night vision goggles giving binocular vision, but a single monocular system may be employed if desired. Instead of using a panel 12 which is a ferroelectric liquid crystal display reflective micro-display panel, other forms of reflective micro-display means may be employed.

What is claimed is:

1. Apparatus for providing a simulated night vision goggle display, which apparatus comprises night vision goggle means giving night vision at night, reflective micro-display means for illuminating the night vision goggle means, tracker means for tracking the attitude of the night vision goggle means, and image generator means for providing infrared images to the night vision goggle means, the image generator means being such that it has a first channel which is used to drive the reflective micro-display means with a high level of illumination, a second channel which is used to drive the reflective micro-display means with a medium level of illumination, and a third channel which is used to drive the reflective micro-display means with a low level of illumination.

2. Apparatus according to claim 1 in which the reflective micro-display means is ferroelectric liquid crystal display reflective micro-display means.

3. Apparatus according to claim 2 in which the ferroelectric liquid crystal display reflective micro-display means is in the form of a panel.

4. Apparatus according to claim 1 in which the tracker means is a 3 degrees of freedom tracker.

5. Apparatus according to claim 1 in which the first, second and third channels are each assigned to at least one light emitting diode, and in which the light emitting diodes for each of the first, second and third channels have progressively lower light outputs.

6. Apparatus according to claim 5 in which the progressively lower light outputs are achieved electrically, or with the use of neutral density filters.

7. Apparatus according to claim 1 in which the night vision goggle means has potentiometer focusing means for focusing the night vision goggle means.

8. Apparatus according to claim 1 in which the night vision goggle means is binocular or monocular.

* * * * *